(12) United States Patent
Park et al.

(10) Patent No.: US 9,924,453 B2
(45) Date of Patent: Mar. 20, 2018

(54) METHOD AND DEVICE FOR DETERMINING CELL IDENTIFIER

(71) Applicant: LG ELECTRONICS INC., Seoul (KR)

(72) Inventors: Kungmin Park, Seoul (KR); Heejeong Cho, Seoul (KR); Hyunsoo Ko, Seoul (KR); Hyeyoung Choi, Seoul (KR); Ilmu Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/502,746

(22) PCT Filed: Sep. 18, 2014

(86) PCT No.: PCT/KR2014/008696
§ 371 (c)(1),
(2) Date: Feb. 8, 2017

(87) PCT Pub. No.: WO2016/043363
PCT Pub. Date: Mar. 24, 2016

(65) Prior Publication Data
US 2017/0238243 A1    Aug. 17, 2017

(51) Int. Cl.
*H04W 4/00* (2009.01)
*H04W 36/00* (2009.01)
*H04W 48/16* (2009.01)
*H04W 72/04* (2009.01)
*H04L 5/00* (2006.01)

(52) U.S. Cl.
CPC ......... *H04W 48/16* (2013.01); *H04W 72/042* (2013.01); *H04L 5/0055* (2013.01)

(58) Field of Classification Search
CPC .... H04W 48/16; H04W 72/042; H04L 5/0055
USPC .......................................................... 455/434
See application file for complete search history.

(56) References Cited

U.S. PATENT DOCUMENTS

| 2003/0119501 | A1* | 6/2003 | Kim ..................... H04W 24/02 455/433 |
| 2010/0234016 | A1  | 9/2010 | Palanki et al. |
| 2010/0311407 | A1* | 12/2010 | Yao ................... H04W 36/0083 455/422.1 |

(Continued)

FOREIGN PATENT DOCUMENTS

| KR | 10-2014-0055511 A | 5/2014 |
| WO | 2014/007308 A2 | 1/2014 |
| WO | 2014/029107 A1 | 2/2014 |

*Primary Examiner* — Rafael Pérez-Gutiérrez
*Assistant Examiner* — Mark G. Pannell
(74) *Attorney, Agent, or Firm* — Dentons US LLP (57) ABSTRACT

Disclosed are a method and a device for determining a cell identifier. A method for determining a cell identifier can comprise the steps of: a network control unit generating an Nth neighbor cell list which comprises information about a neighboring cell of a search cell; the network control unit receiving, from a search cell, information about a global cell identifier and a first PCI of an unknown cell; the network control unit determining whether or not the unknown cell is a moving cell on the basis of the global cell identifier; and, if the unknown cell is a moving cell and the first PCI and a second PCI of a neighbor cell that is comprised in the Nth neighbor cell list, the network control unit transmitting to the moving cell a PCI change signal that requests changing of the first PCI.

8 Claims, 8 Drawing Sheets

(56) References Cited

U.S. PATENT DOCUMENTS

| | | | |
|---|---|---|---|
| 2010/0330989 A1* | 12/2010 | Song | H04W 48/16 455/434 |
| 2012/0115459 A1* | 5/2012 | Deng | H04W 36/0094 455/422.1 |
| 2013/0150034 A1* | 6/2013 | Kondo | H04W 36/0083 455/434 |
| 2013/0183971 A1* | 7/2013 | Tamaki | H04W 36/0061 455/436 |
| 2014/0071891 A1* | 3/2014 | Zhou | H04J 11/0069 370/328 |
| 2014/0080468 A1* | 3/2014 | Zhang | H04W 24/02 455/418 |
| 2015/0156708 A1* | 6/2015 | Tietz | H04W 4/02 455/434 |
| 2015/0215851 A1* | 7/2015 | Sivavakeesar | H04W 24/02 455/434 |

\* cited by examiner

METHOD AND DEVICE FOR DETERMINING CELL IDENTIFIER

CROSS-REFERENCE TO RELATED APPLICATIONS

This application is the National Stage filing under 35 U.S.C. 371 of International Application No. PCT/KR2014/008696, filed on Sep. 18, 2014, the contents of which are hereby incorporated by reference herein in their entirety.

BACKGROUND OF THE INVENTION

Field of the Invention

The present invention relates to wireless communications, and more particularly, to a method and a device for determining a cell identifier.

Related Art

After a radio resource control (RRC) connection is established, a user equipment (UE) may receive a measurement report request from a connected base station. The UE may continuously report a measurement to the base station according to an indication in the measurement report request in an RRC-connected mode.

The UE may report all detected physical cell identifiers (PCIs) according to a measurement report criterion indicated by the connected base station in the RRC-connected mode. A PCI is a cell identifier, which may be a reusable value assigned in a local area. There is a possibility that a specific cell and another cell have the same PCI.

When a measurement report received from the UE includes identification information on an unknown cell, automatic neighbor relation (ANR) of the connected base station may start a procedure for identifying the unknown cell for a possible handover to the unknown cell.

When the unknown cell is not registered as a neighbor cell in the connected base station, ANR of the connected base station may request the UE to detect the E-UTRAN cell global identifier (ECGI) of the unknown cell in order to identify the unknown cell. ECGI information is the unique identifier of a cell. A PCI value may be reusable, while ECGI is the unique value of each base station.

The UE requested to detect the ECGI of the unknown cell may receive ECGI information transmitted from the unknown cell and may report the ECGI information to the connected base station. When the ECGI information on the unknown cell is reported, the connected base station may obtain the Internet Protocol (IP) address of a neighbor base station by the aid of a mobility management entity (MME) as one component of an evolved packet core (EPC).

SUMMARY OF THE INVENTION

An object of the present invention is to provide a method for determining a cell identifier.

Another object of the present invention is to provide a device for determining a cell identifier.

To achieve the foregoing object of the present invention, an aspect of the present invention provides a method for determining a cell identifier, the method including: generating, by a network controller, an Nth neighbor cell list including information on a neighbor cell of a detecting cell; receiving, by the network controller, information on a first physical cell identifier (PCI) and a global cell identifier of an unknown cell from the detecting cell, the first PCI being identification information in a local area that is also available for a cell other than the unknown cell and the global cell identifier being unique identification information allocated only to the unknown cell; determining, by the network controller, whether the unknown cell is a moving cell based on the global cell identifier; and transmitting, by the network controller, a PCI change signal that requests a change of the first PCI to the moving cell when the unknown cell is the moving cell and the first PCI is the same as a second PCI of the neighbor cell included in the Nth neighbor cell list, wherein the neighbor cell is listed in the Nth neighbor cell list based on a possibility of interference by movement of the moving cell on the basis of the detecting cell.

To achieve the foregoing object of the present invention, an aspect of the present invention provides a network controller for determining a cell identifier, the network controller including: a communication unit configured to transmit or receive cable and radio signals; and a processor operatively connected to the communication unit, wherein the processor is configured to: generate an Nth neighbor cell list including information on a neighbor cell of a detecting cell; receive information on a first physical cell identifier (PCI) and a global cell identifier of an unknown cell from the detecting cell, the first PCI being identification information in a local area that is also available for a cell other than the unknown cell and the global cell identifier being unique identification information allocated only to the unknown cell; determine whether the unknown cell is a moving cell based on the global cell identifier; and transmit a PCI change signal that requests a change of the first PCI to the moving cell when the unknown cell is the moving cell and the first PCI is the same as a second PCI of the neighbor cell included in the Nth neighbor cell list, and the neighbor cell is listed in the Nth neighbor cell list based on a possibility of interference by movement of the moving cell on the basis of the detecting cell.

According to the present invention, a collision between the PCIs of cells due to a moving cell is predicted in advance, thereby preventing a PCI collision caused by a moving cell. Further, when the PCI of a moving cell is changed, battery consumption due to a handover of a UE served by the moving cell may be reduced and a delay caused by a link setup failure may be prevented.

DESCRIPTION OF EXEMPLARY EMBODIMENTS

Figure 1:
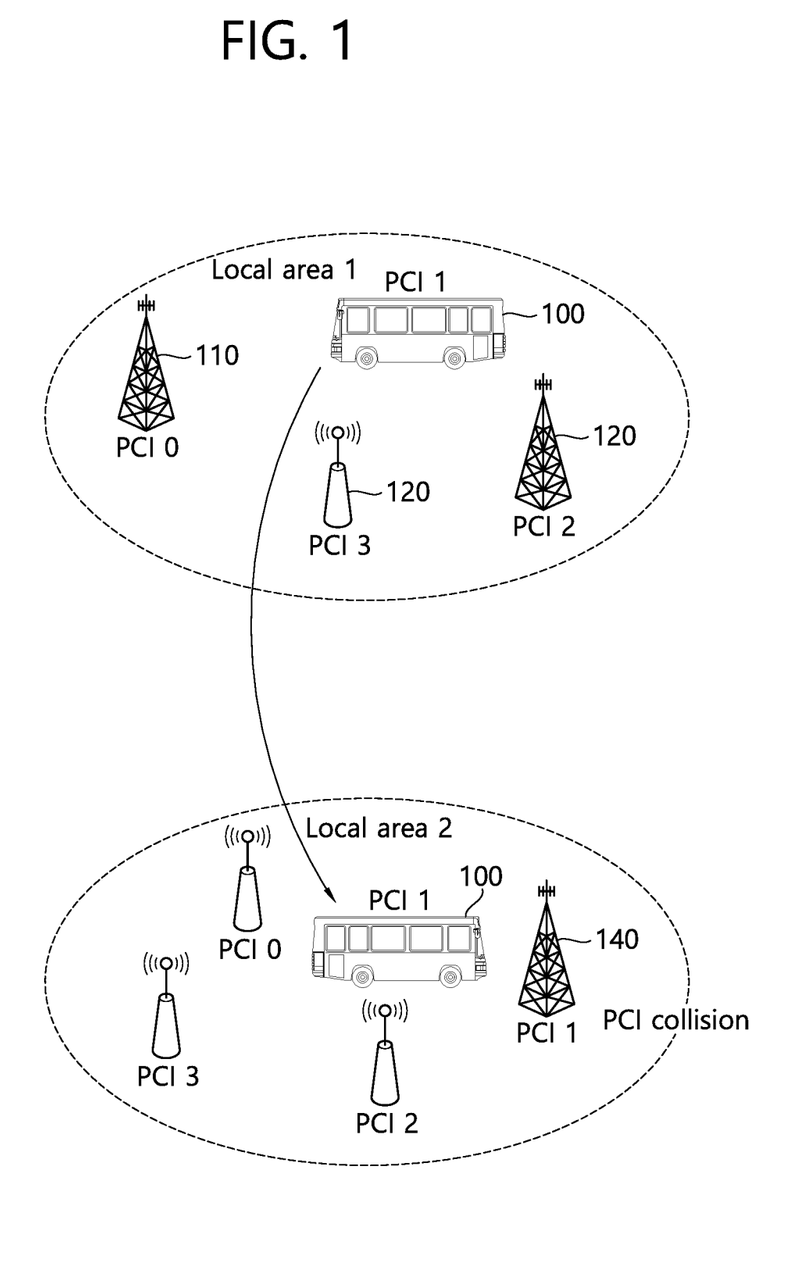
FIG. 1 is a conceptual view illustrating a collision between the physical cell identifiers (PCIs) of cells due to the movement of a moving cell.

FIG. 1 is a conceptual view illustrating a collision between the physical cell identifiers (PCIs) of cells due to the movement of a moving cell.

Hereinafter, in an embodiment of the present invention, a moving cell may refer to a moving base station, and a fixed cell may refer to a stationary base station. A moving cell may be replaced with a moving base station, and a fixed cell may be replaced with a stationary base station.

A PCI may be used as an identifier of a cell. A PCI is a value allocated to a cell in a local area and may be a reusable value. Therefore, there is a possibility that the PCI of a specific cell is the same as the PCI of another cell. E-UTRAN cell global identifier (ECGI) information may be used as an identifier of a cell. ECGI information is the unique identifier of a specific cell. A PCI is a reusable value, while an ECGI is the unique value of each base station. ECGI may be referred to as a global cell ID.

Referring to FIG. 1, three fixed cells 110, 120, and 130 and one moving cell 100 may be located in local area 1. The PCI of the one moving cell 100 may be 1, and the PCIs of the three fixed cells 110, 120, and 130 may be 0, 2, and 3, respectively. As described above, a PCI is a reusable value assigned in a local area. Therefore, there is a possibility that the PCI of a specific cell is the same as the PCI of another cell.

When the moving cell 100 moves from local area 1 to local area 2, the PCI (1) of the moving cell 100 may be the same as the PCI (1) of a fixed cell 140 located in local area 2. When a collision between the PCIs of cells occurs, synchronization signals transmitted from the respective cells may collide. Therefore, a user equipment (UE) may fail to receive a synchronization signal and may fail to connect to a network.

It may be assumed that the PCI of the moving cell 100 is forcibly changed by a network controller in order to avoid a collision between the PCIs of the cells. In this case, when UEs served by the moving cell 100 are not handed over to the moving cell 100 corresponding to a newly changed PCI, the UEs may fail in link connection. In the case of a fixed cell, when a handover to a target cell fails, a UE may establish a connection back to the existing cell. However, in the case of the moving cell 100, since the PCI is changed, a UE may not connect back to the existing cell.

The current cellular network supports 503 PCIs from 0 to 502. Based on buses running in Seoul, a large number of moving cells 100, for example, 2000 moving cells, may be present. Therefore, there is a high possibility of a collision between the moving cells 100 and fixed cells.

Hereinafter, an embodiment of the present invention discloses a specific method for preventing a collision between cell PCIs due to a moving cell 100 and for handing over a UE served by the moving cell 100 when the PCI of the moving cell 100 is changed.

According to the embodiment of the present invention, a network controller, such as a mobility management entity (MME), may predict a collision between cell PCIs and may change the PCI of a moving cell 100 if needed in order to prevent a PCI collision due to the movement of the moving cell 100.

Figure 2:
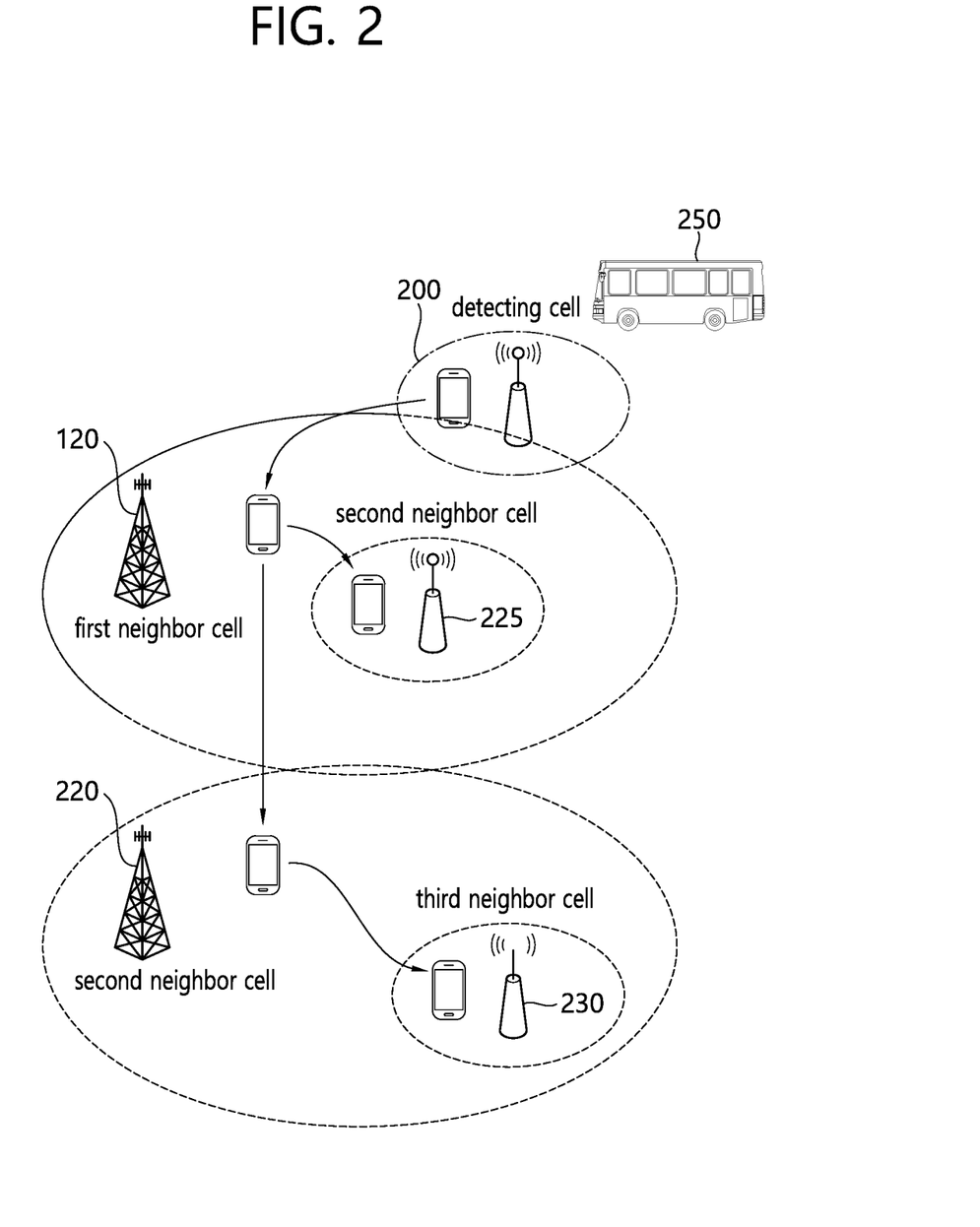
FIG. 2 is a conceptual view illustrating a method of predicting a PCI collision caused by a moving cell according to an embodiment of the present invention.

FIG. 2 is a conceptual view illustrating a method of predicting a PCI collision caused by a moving cell according to an embodiment of the present invention.

FIG. 2 discloses a method of predicting a PCI collision based on an Nth neighbor cell list.

Referring to FIG. 2, a specific cell 200 may detect the movement of a moving cell. The cell that detects the movement of the moving cell is referred to as a detecting cell 200. For example, a UE served by the detecting cell 200 may receive a synchronization signal or a cell detection signal transmitted by the moving cell 250 and may detect whether the moving cell 250 is a new cell. The UE may report, to the detecting cell 200, identification information (for example, PCI and ECGI) on the moving cell 250 detected by the movement of the moving cell 250.

Specifically, the UE connected to the detecting cell 200 may report identification information on all cells detected according to a measurement report criterion indicated by the detecting cell (connected base station) 200 in an RRC connected mode. When a measurement report received from the UE includes an unknown cell, the detecting cell 200 may perform a procedure for identifying the unknown cell for a potential handover to the unknown cell.

According to the embodiment of the present invention, when the detecting cell 200 identifies the moving cell 250, the detecting cell 200 may generate an Nth neighbor cell list based on the detecting cell 200. The Nth neighbor cell list may include information on a possibility of interference by the moving cell with neighbor cells. In the Nth neighbor cell list, a neighbor cell with a relatively higher possibility of interference by the moving cell may be allocated a lower order.

A neighbor cell adjacent to the detecting cell 200 may be set as a first neighbor cell 120. Next, a neighbor cell adjacent to the first neighbor cell 120 may be set as a second neighbor cell 220 and 225. Likewise, a neighbor cell adjacent to the second neighbor cell 220 may be set as a third neighbor cell 230. That is, the Nth neighbor cell list includes the first neighbor cell and the Nth neighbor cell (here, N is a natural number of 2 or greater), the first neighbor cell indicates a cell adjacent to the detecting cell, and the Nth neighbor cell may be a cell adjacent to an (N−1)th neighbor cell. A neighbor cell included in the Nth neighbor cell list may be the first neighbor cell or the Nth neighbor cell in the Nth neighbor cell list.

In this manner, the Nth neighbor cell list, which includes at least one neighbor cell based on the detecting cell, may be generated. That is, a neighbor cell more adjacent to the detecting cell 200 is more likely to receive interference by the moving cell 250 and may have a relatively higher order in the Nth neighbor cell list.

According to the embodiment of the present invention, a network controller may predict a possibility of a collision between the PCI of a neighbor cell (or neighbor fixed cell) and the PCI of the moving cell based on the Nth neighbor cell list generated by the detecting cell 200. As a result of prediction, when there is a possibility of a collision between the PCIs of the neighbor cell and the moving cell, the network controller may request the moving cell 250 to change the PCI.

Specifically, the network controller may generate an Nth neighbor cell list based on the detecting cell 200. When the moving cell approaches the detecting cell 200, the detecting cell 200 may transmit the identification information (for example, PCI and ECGI) on the moving cell 250 to the network controller (for example, an MME). The network controller may predict a possibility of a collision between the PCIs of the cells caused by the movement of the moving cell 250 based on the Nth neighbor cell list for the detecting cell 200 and the identification information on the moving cell 250. For example, the network controller may determine whether the PCIs of the neighbor cells 210, 220, 225, and 230 included in the Nth neighbor cell list for the detecting cell 200 are the same as the PCI of the moving cell 250.

If the same PCI as the PCI of the moving cell 250 is present among the PCIs of the neighbor cells 210, 220, 225, and 230 included in the Nth neighbor cell list, the network controller may request the moving cell 250 to change the PCI. On the contrary, when the PCIs of neighbor cells 210, 220, 225, and 230 included in the Nth neighbor cell list are not the same as the PCI of the moving cell 250, the network controller may not request the moving cell 250 to change the PCI.

The network controller may generate an Nth neighbor list for all controlled cells but may generate an Nth neighbor list only for a specific cell to decrease complexity. For example, a specific cell for which an Nth neighbor list is generated may be a cell located on the edge of the network controller (for example, MME edge).

The network controller may determine a PCI change timing of the moving cell 250 in view of the distance between the moving cell and a neighbor cell having the same PCI as the PCI of the moving cell 250 based on location information on the moving cell 250 and location information on the neighbor cell. Although the PCIs of the neighbor cells included in the Nth neighbor cell list are the same as the PCI of the moving cell 250, interference by a PCI collision between the neighbor cells and the moving cell may not occur according to a moving direction of the moving cell (or the distance between the neighbor cells and the moving cell).

Therefore, even though the PCI of a neighbor cell included in the Nth neighbor cell list is the same as the PCI of the moving cell 250, the network controller may request the moving cell 250 to change the PCI only when the neighbor cell having the same PCI as the moving cell 250 becomes close to the moving cell 250 by a certain threshold distance or shorter.

According to another embodiment of the present invention, the network controller may change the PCI of the moving cell based on a map on a relationship between cells located within a certain area. For example, the network controller may generate an inter-cell relationship map including information on relationships between a plurality of cells managed by the network controller. The inter-cell relationship map may include information on relationships between a plurality of cells, such as information on the location of each of the plurality of cells, information on a cell adjacent to each of the plurality of cells, and information on the coverage of each of the plurality of cells.

When the presence of the moving cell is reported to the network controller, the network controller may determine the necessity to change the PCI of the moving cell using the inter-cell relationship map. Likewise, the network controller may determine a PCI change timing of the moving cell in view of the current location of the moving cell and location information on a cell having the same PCI as the PCI of the moving cell.

According to still another embodiment of the present invention, the network controller may utilize a local cell list, instead of creating a separate Nth neighbor cell list for the detecting cell. The local cell list may be a list including PCI information on all cells managed by the network controller. When the PIC of the moving cell is the same as the PCI of a specific cell included in the local cell list, the network controller may request the moving cell to change the PCI.

Figure 3:
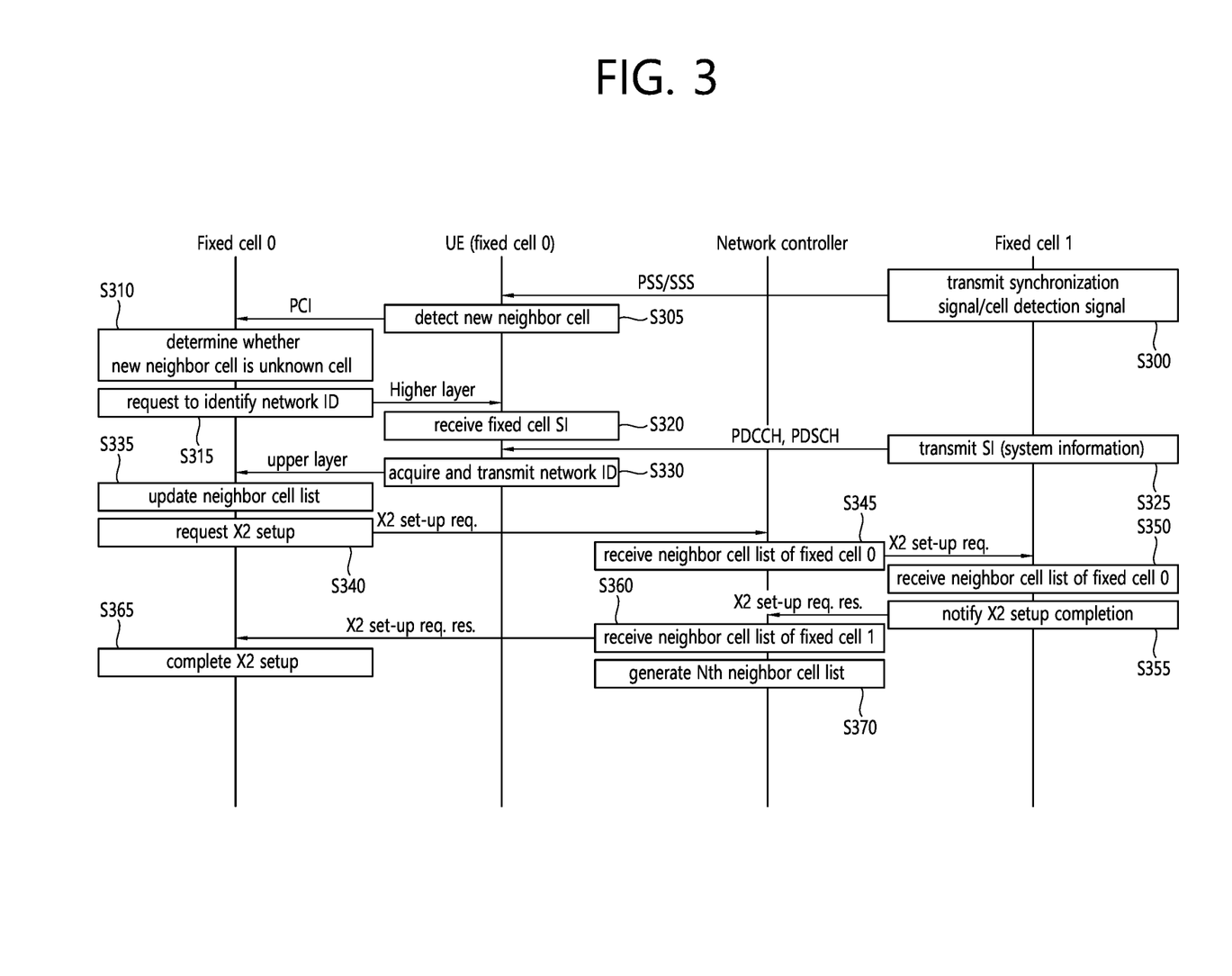
FIG. 3 is a conceptual view illustrating a method of generating an Nth neighbor cell list according to an embodiment of the present invention.

FIG. 3 is a conceptual view illustrating a method of generating an Nth neighbor cell list according to an embodiment of the present invention.

FIG. 3 discloses a method of generating an Nth neighbor cell list for a specific cell (for example, fixed cell 0) based on an inter-neighbor cell automatic detection process.

Referring to FIG. 3, fixed cell 1 may transmit a synchronization signal or a cell detection signal (operation S300).

A UE served by fixed cell 0 may receive the synchronization signal or the cell detection signal from fixed cell 1 and may transmit identification information (for example, PCI) on fixed cell 1 to fixed cell 0 (operation S305).

When a UE detects a new neighbor cell, the UE may transmit identification information on the new neighbor cell to a serving cell.

Fixed cell 0 may determine whether fixed cell 1 is an unknown cell based on the identification information on fixed cell 1 (operation S310).

When fixed cell 1 is an unknown cell, fixed cell 0 may request the UE to identify a network identifier (ID, for example, ECGI) of fixed cell 1 (operation S315).

The UE may receive system information on fixed cell 1 (operation S320).

The UE may receive the system information from fixed cell 1 through a data channel and a control channel, such as a physical downlink control channel (PDCCH) and a physical downlink shared channel (PDSCH) (operation S325)

The system information may include network identification information on fixed cell 1.

The UE may transmit the information on the network ID of fixed cell 1 to fixed cell 0 (operation S330).

Fixed cell 0 may update neighbor cell list 0 based on the information on the network ID of fixed cell 1 (operation S335).

Neighbor cell list 0 may be a neighbor cell list of fixed cell 0.

Fixed cell 0 may make a request to set up an X2 interface with fixed cell 1 based on the network ID of fixed cell 1 (operation S340).

Fixed cell 0 may request the network controller to set up the X2 interface. Further, fixed cell 0 may transmit the updated neighbor cell list to the network controller.

The network controller may receive the neighbor cell list from fixed cell 0 (operation S345).

The network controller may request fixed cell 1 to set up the X2 interface with fixed cell 0.

Further, the network controller may transmit the neighbor cell list of fixed cell 0 to fixed cell 1 (operation S350).

Fixed cell 1 may update neighbor cell list 1 of fixed cell 1 based on received neighbor cell list 0 of fixed cell 0.

Fixed cell 1 may notify the network controller that the X2 interface has been set up (operation S355).

Further, fixed cell 1 may transmit neighbor cell list 1 of fixed cell 1 to the network controller.

The network controller may receive neighbor cell list 1 from fixed cell 1 (operation S360).

The network controller may transmit an X2 interface setup completion message from fixed cell 0 (operation S365).

The network controller may generate an Nth neighbor cell list for fixed cell 0 based on neighbor cell list 0 of fixed cell 0 and neighbor cell list 1 of fixed cell 1 (operation S370).

The network controller may generate an Nth neighbor cell list including information on a possibility of interference by a moving cell with neighbor cells.

For example, the network controller may generate the Nth neighbor cell list by determining the relative distance between neighbor cells based on fixed cell 0 in view of location information on neighbor cells included in each of the neighbor cell lists. The Nth neighbor cell list may be generated by determining the relative locations of neighbor cells radially located from a detecting cell and/or the coverages of the neighbor cells.

Alternatively, the network controller may determine, as a first neighbor cell, at least one neighbor cell adjacent to the detecting cell based on whether cells are adjacent and may determine, as a second neighbor cell, at least one adjacent neighbor cell based on the first neighbor cell, thereby generating the Nth neighbor cell list. A plurality of neighbor cells with the same rank may be included in the Nth neighbor cell list.

Alternatively, the network controller may generate the Nth neighbor cell list further considering the moving direction of the moving cell based on fixed cell 0. When the moving directions of a plurality of moving cells are considered, an Nth neighbor cell list corresponding to the moving directions of the plurality of moving cells may be generated for one fixed cell.

Figure 4:
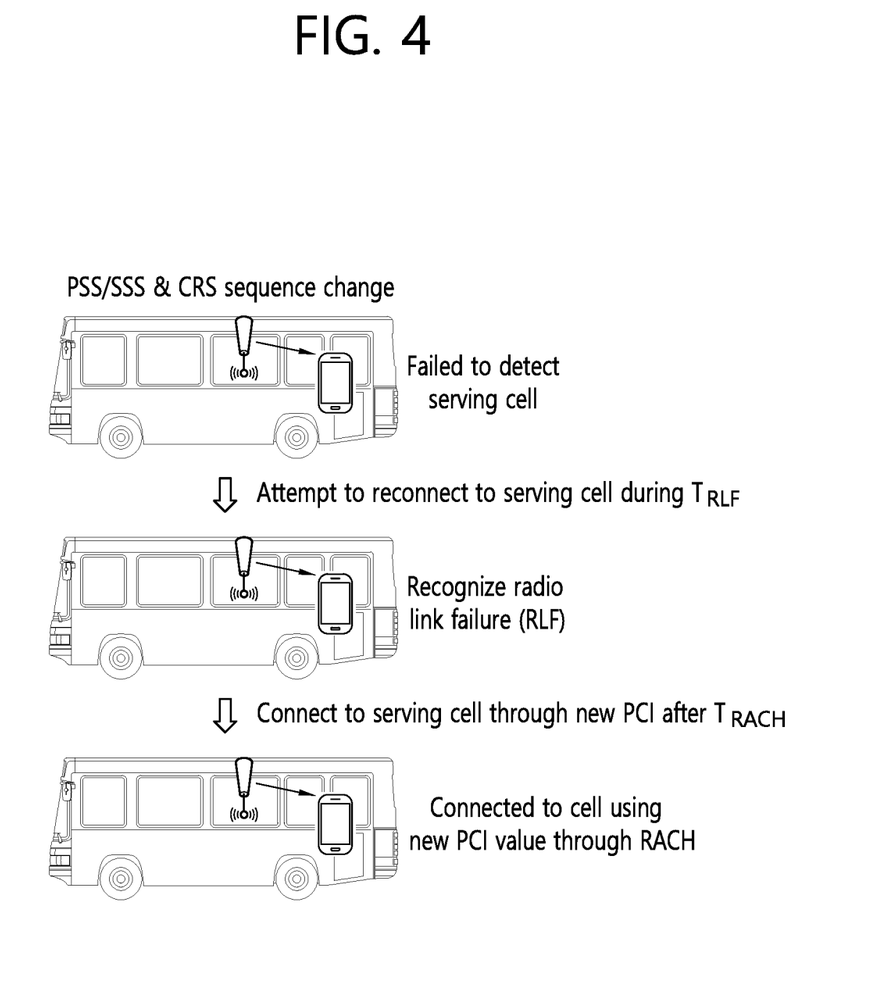
FIG. 4 discloses an operation of a UE according to a change in the PCI of a moving cell according to an embodiment of the present invention.

FIG. 4 discloses an operation of a UE according to a change in the PCI of a moving cell according to an embodiment of the present invention.

FIG. 4 illustrates a problem that may occur to a UE when the PCI of a moving cell is changed without notice.

Referring to FIG. 4, when the PCI of a moving cell is changed without notice, a UE served by the moving cell may fail in connection and may not be served by the moving cell for a long time. Specifically, it may be assumed that a network controller forcibly changes the PCI of the moving cell without notice in order to prevent a collision between the PCIs of cells. In this case, when a handover of the UE fails, a change in the PCI of the moving cell may not allow the UE to establish a connection back to the previous moving cell corresponding to the PCI before the change.

A PCI before a change may be referred to as an old PCI, and a PCI after a change may be referred to as a new PCI. Further, a moving cell corresponding to a PCI before a change may be referred to as an old PCI moving cell, and the moving cell corresponding to a PCI after a change may be referred to as a new PCI moving cell.

Referring to FIG. 4, when the UE does not recognize a PCI change of the moving cell, the UE may receive a synchronization signal (primary synchronization signal (PSS)/secondary synchronization signal (SSS)) and/or a reference signal (for example, a cell-specific reference signal (CRS)) generated based on the new PCI. Due to the PCI change, the UE is unable to detect the old PCI moving cell corresponding to the old PCI. Thus, the UE may attempt to reconnect to the old PCI moving cell during $T_{RLF}$. Since the PCI of the moving cell is changed, the UE may recognize a radio link failure (RLF). The UE may attempt to connect to the new PCI moving cell after $T_{RACH}$. The UE may be connected to the new PCI moving cell through an RACH.

When the UE is unable to detect the PCI change of the moving cell, the UE may detect the new PCI moving cell through the foregoing procedure and may lose a connection to a link for a long time.

Hereinafter, an embodiment of the present invention discloses a method of handing over a UE when the PCI of a moving cell is changed.

According to the embodiment of the present invention, a handover of the UE may be induced before the PCI of the moving cell is changed. For example, the moving cell may first transmit a handover request message to a UE served by the moving cell. When the handover request message is received, the UE may be temporarily handed over to a cell other than the moving dell. Alternatively, the power of the moving cell may be gradually reduced for a moment to induce the UE served by the moving cell to be handed over to another cell.

Subsequently, the moving cell may change the PCI and then may transmit a new PCI-based synchronization signal to the UE. The UE may receive the new PCI-based synchronization signal and may connect to the new PCI moving cell.

According to another embodiment of the present invention, the moving cell may forcibly hand over the UE. The moving cell may command a handover of the UE before the UE requests a handover. In the embodiment of the present invention, a higher-layer signal for forcing a handover by the moving cell may be defined. The higher-layer signal for a moving cell-triggered handover may include information on a handover instruction, a new PCI value, a handover completion report, and a PCI change completion report.

Hereinafter, a method of a handover forced by a moving cell is disclosed in detail.

Figure 5:
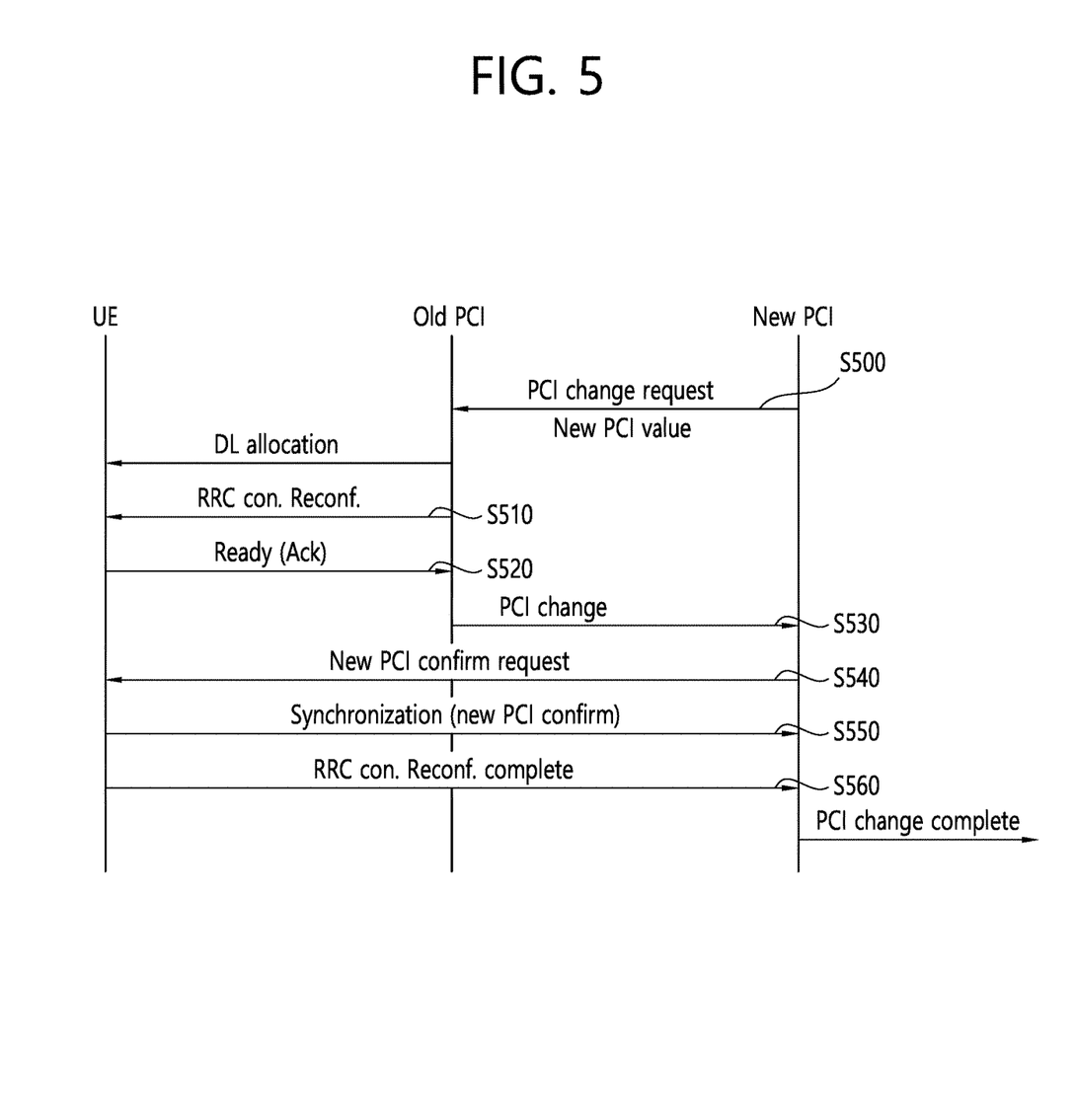
FIG. 5 is a flowchart illustrating a handover method according to an embodiment of the present invention.

FIG. 5 is a flowchart illustrating a handover method according to an embodiment of the present invention.

In FIG. 5, a moving cell corresponding to a PCI before a change may be referred to as an old PCI moving cell, and the moving cell corresponding to a PCI after a change may be referred to as a new PCI moving cell.

Referring to FIG. 5, for a moving cell-triggered handover, an old PCI moving cell may receive a PCI change request message from a higher layer (operation S500).

The PCI change request message may be a message to request a change in the PCI of the moving cell. The PCI change request message may include information on a new PCI value.

When the PCI change request message is received, the old PCI moving cell may transmit an RRC connection reconfiguration message to a UE (operation S510).

The RRC connection reconfiguration message may include information to indicate a change of the old PCI moving cell, which currently provides a service, to a new PCI moving cell and/or information on a new PCI. When the RRC connection reconfiguration message is received, the UE may perform a handover from the old PCI moving cell to the new PCI moving cell.

When the RRC connection reconfiguration message is received, the UE may transmit an acknowledgement (ACK) to the moving cell in response to the RRC connection reconfiguration message (operation S520).

When the ACK is received, the old PCI moving cell changes an old PCI to the new PCI, thereby changing to the new PCI moving cell (operation S530).

The new PCI moving cell may transmit a new PCI confirmation request message to the UE (operation S540).

The new PCI confirmation request message may be a message for confirming whether the UE is handed over from the old PCI moving cell to the new PCI moving cell and for synchronizing the UE and the new PCI moving cell.

When the new PCI confirmation request message is received, the UE may synchronize with the new PCI moving cell (operation S550).

Further, the UE may transmit a new PCI confirmation message for confirming that the UE has been handed over to the new PCI moving cell to the new PCI moving cell.

The UE may transmit an RRC connection reconfiguration completion message to the new PCI moving cell (operation S560).

Further, the new moving cell may transmit a PCI change completion message indicating that a change from the old PCI to the new PCI is completed to a higher layer.

Figure 6:
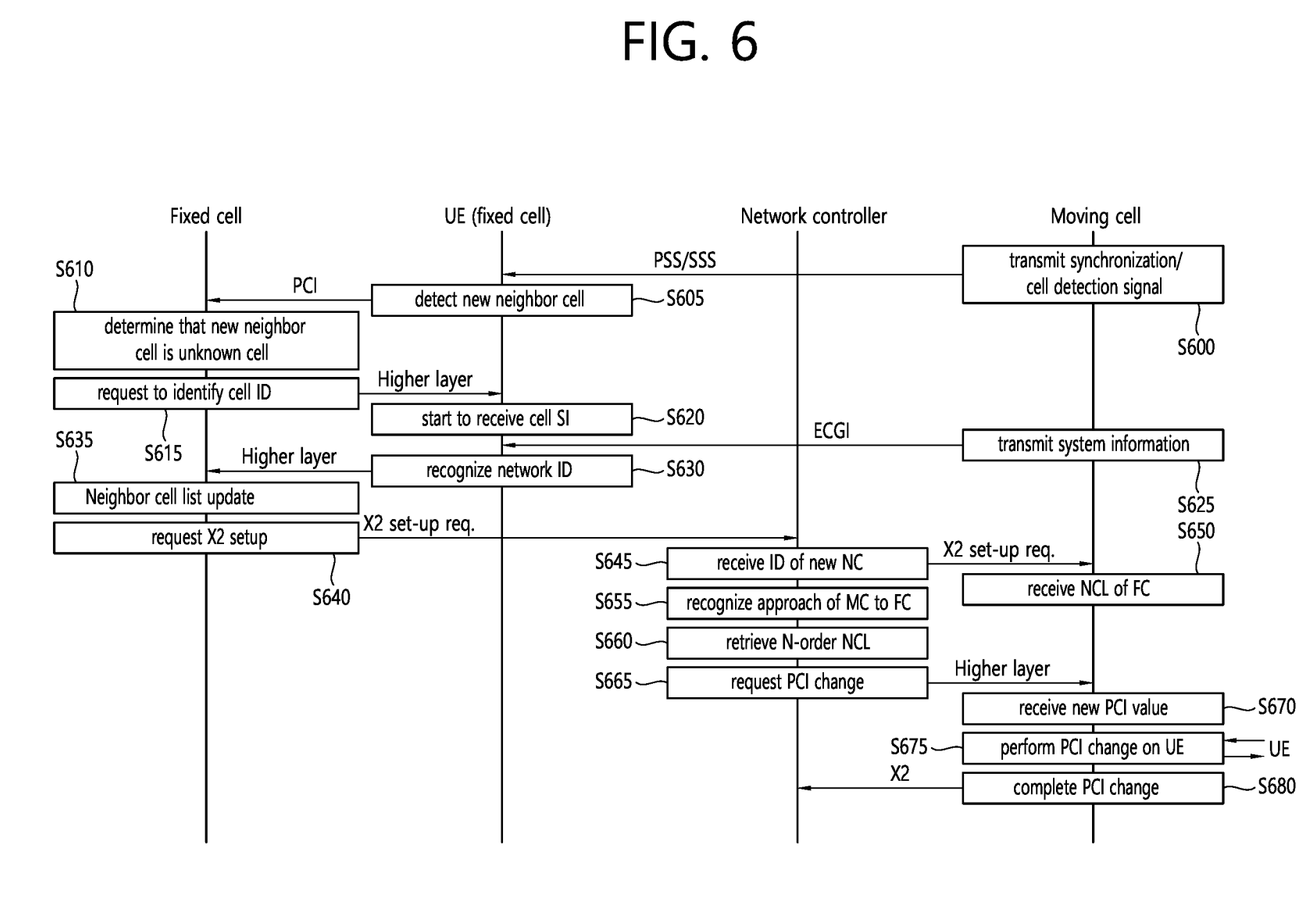
FIG. 6 is a conceptual view illustrating an operation of changing the PCI of a moving cell according to an embodiment of the present invention.

FIG. 6 is a conceptual view illustrating an operation of changing the PCI of a moving cell according to an embodiment of the present invention.

FIG. 6 discloses an operation of changing the PCI of a moving cell by a network controller when a fixed cell does not recognize whether an unknown cell is a fixed cell or a moving cell.

Referring to FIG. 6, a moving cell may transmit a synchronization signal or a cell detection signal (operation S600).

A UE of a fixed cell may receive the synchronization signal or the cell detection signal from the moving cell and may detect that the moving cell is a new neighbor cell (operation S605).

The UE may transmit identification information (for example, PCI) on the moving cell to the fixed cell.

The fixed cell may determine whether the moving cell is an unknown cell based on the received identification information on the moving cell (operation S610).

When the moving cell is an unknown cell, the fixed cell may request the UE to identify a network ID (for example, ECGI) of the moving cell (operation S615).

The UE may receive system information on the moving cell (operation S620).

The moving cell may transmit the system information including ECGI information to the UE (operation S625).

The UE may receive the system information through a control channel and a data channel of the moving cell (operation S630).

The system information may include information on the network ID of the moving cell. The UE may transmit the information on the network ID of the moving cell to the fixed cell.

The fixed cell may update a neighbor cell list based on the received information on the network ID of the moving cell (operation S635).

The fixed cell may request a network controller to set up an X2 interface with the moving cell (operation S640).

Further, the fixed cell may transmit the updated neighbor cell list to the network controller.

The network controller may receive ID information a new cell (that is, ID information on the moving cell) from the fixed cell (operation S645).

The network controller may transmit an X2 interface setup request message to the moving cell based on the received ID information the new cell (that is, ID information on the moving cell).

Further, the network controller may transmit the neighbor cell list of the fixed cell to the moving cell (operation S650).

The network controller may recognize the approach of the moving cell based on the identification information on the moving cell included in the updated neighbor cell list (operation S655).

For example, when new ECGI information included in the neighbor cell list is not registered in the network controller, the network controller may recognize the approach of the moving cell to the fixed cell.

The network controller may detect an N neighbor cell list of the fixed cell and may determine whether the PCI of a specific neighbor cell included in the Nth neighbor cell list is the same as the PCI of the moving cell (operation S660).

When the PCI of the specific neighbor cell included in the Nth neighbor cell list is the same as the PCI of the moving cell, the network controller may request the moving cell to change the PCI through a higher layer (operation S665).

The moving cell may receive information on a new PCI from the network controller (operation S670). The moving cell requested to change the PCI may forcibly hand over the UE using the handover method of the UE illustrated in FIG. 5 and may change the PCI (operation S675).

When the PCI has been changed, the moving cell may transmit a PCI change completion message, which indicates that the PCI has been changed to the new PCI, to the network controller (operation S680).

Figure 7:
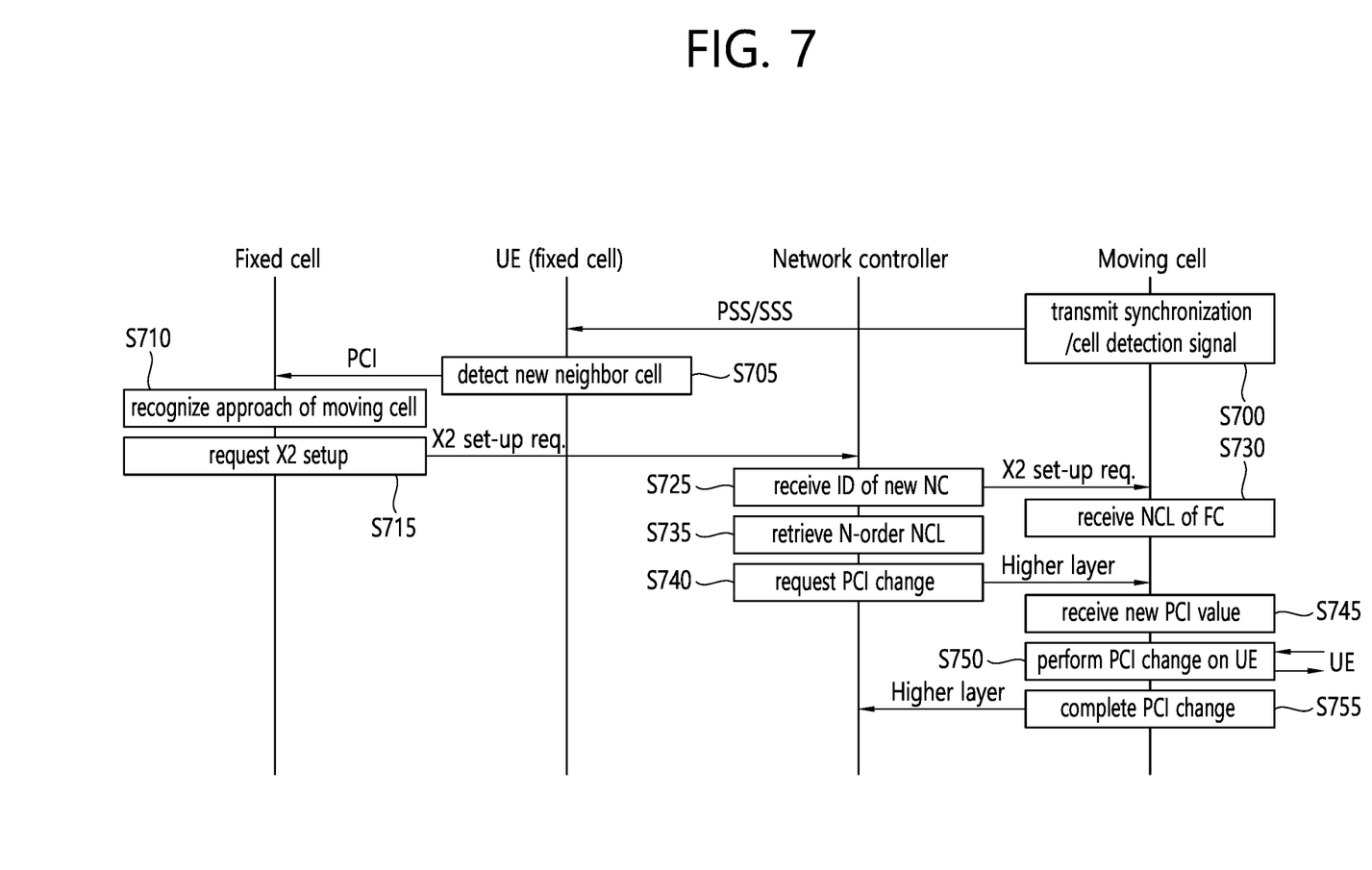
FIG. 7 is a conceptual view illustrating an operation of changing the PCI of a moving cell according to an embodiment of the present invention.

FIG. 7 is a conceptual view illustrating an operation of changing the PCI of a moving cell according to an embodiment of the present invention.

FIG. 7 discloses an operation of changing the PCI of a moving cell by a network controller when a fixed cell recognizes whether an unknown cell is a fixed cell or a moving cell.

Referring to FIG. 7, a moving cell may transmit a synchronization signal or a cell detection signal (operation S700).

A UE of a fixed cell may receive the synchronization signal or the cell detection signal from the moving cell and may detect that the moving cell is a new neighbor cell (operation S705).

The UE of the fixed cell may transmit identification information (for example, PCI) on the moving cell to the fixed cell.

When the fixed cell knows the identification information on the moving cell, the fixed cell may recognize the approach of the moving cell based on the received identification information on the moving cell (operation S710).

For example, the fixed cell may already have information on ID information (for example, PCI and ECGI) on the moving cell that is likely to approach the fixed cell. When a detected cell is the moving cell, the fixed cell may not update a neighbor cell list.

When the approach of the moving cell is recognized, the fixed cell may request a network controller to set up an X2 interface with the moving cell (operation S715).

Further, the fixed cell may transmit the identification information on the moving cell that approaches the network controller to the network controller.

Further, the network controller may receive the ID information on the moving cell from the fixed cell (operation S725).

The network controller may transmit an X2 interface setup request message to the moving cell.

Also, the network controller may transmit the neighbor cell list of the fixed cell to the moving cell (operation S730).

The network controller may receive the identification information on the approaching moving cell and may determine whether the PCI of a neighbor cell included in an Nth neighbor cell list is the same as the PCI of the moving cell (operation S735).

When the PCI of the specific neighbor cell included in the Nth neighbor cell list is the same as the PCI of the moving cell, the network controller may request the moving cell to change the PCI through a higher layer (operation S740).

The moving cell may receive information on a new PCI (operation S745). The moving cell requested to change the PCI may forcibly hand over the UE using the foregoing handover method of the UE and may change the PCI (operation S750).

When the PCI has been changed, the moving cell may transmit a PCI change completion message, which indicates that the PCI has been changed to the new PCI, to the network controller (operation S755).

Figure 8:
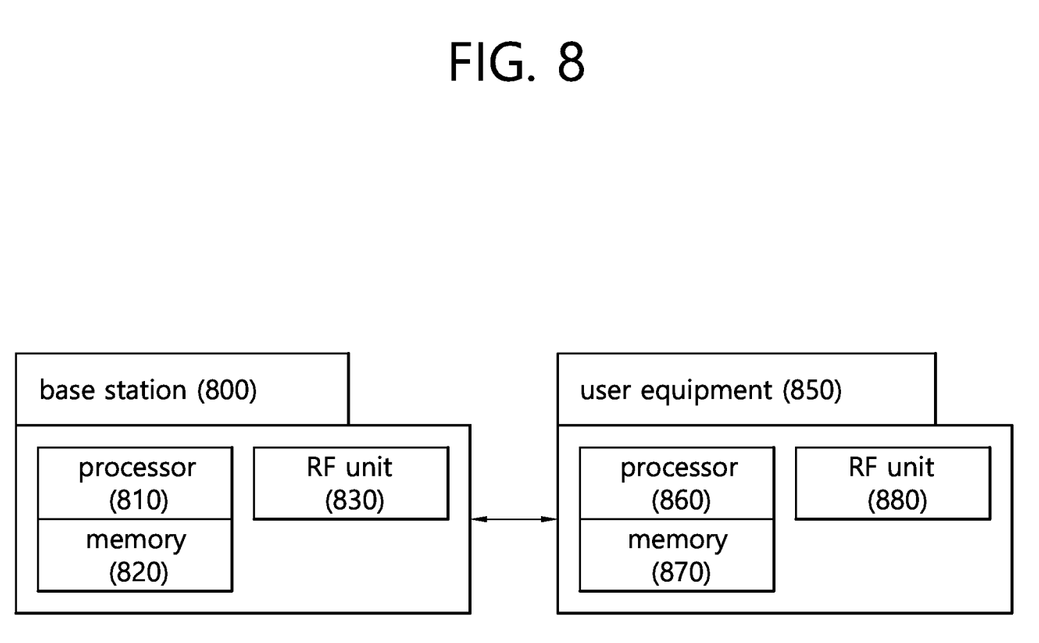
FIG. 8 is a block diagram illustrating a wireless communication system according to an embodiment of the present invention.

FIG. 8 is a block diagram illustrating a wireless communication system according to an embodiment of the present invention.

Referring to FIG. 8, a base station 800 includes a processor 810, a memory 820, and a radio frequency (RF) unit 830. The memory 820 is connected to the processor 810 and stores various pieces of information to operate the processor 810. The RF 820 is connected to the processor 810 and transmits and/or receives a radio signal. The processor 810 implements proposed functions, processs and/or methods. The operations of the base station illustrated in the above embodiments may be implemented by the processor 810.

For example, the processor 810 may be configured to receive a PCI change signal from a network controller and to change a PCI based on the PCI change signal. Further, before a PCI is changed, the processor 810 may transmit an RRC reconfiguration signal to a UE to transmit information on a PCI to be changed.

A wireless device 850 includes a processor 860, a memory 870, and an RF unit 880. The memory 870 is connected to the processor 860 and stores various pieces of information to operate the processor 860. The RF 880 is connected to the processor 860 and transmits and/or receives a radio signal. The processor 860 implements proposed functions, processs and/or methods. The operations of the wireless device illustrated in the above embodiments may be implemented by the processor 860.

For example, the processor 860 may receive an RRC reconfiguration signal from a base station and may perform a handover to a cell corresponding to a PCI indicated based on the RRC reconfiguration signal.

The network controller according to the embodiment of the present invention may include a communication unit configured to transmit or receive cable and radio signals and a processor operatively connected to the communication unit.

The processor of the network controller may be configured to generate an Nth neighbor cell list including information on a neighbor cell of a detecting cell and to receive information on a first PCI and a global cell ID of an unknown cell from the detecting cell. Here, the first PCI may be identification information in a local area that is also available for a cell other than the unknown cell, and the global cell identifier may be unique identification information allocated only to the unknown cell. Further, the processor of the network controller may be configured to determine whether the unknown cell is a moving cell based on the global cell identifier and to transmit a PCI change signal that requests a change of the first PCI to the moving cell when the unknown cell is the moving cell and the first PCI is the same as a second PCI of the neighbor cell included in the Nth neighbor cell list.

The neighbor cell may be listed in the Nth neighbor cell list based on a possibility of interference by movement of the moving cell on the basis of the detecting cell.

The processors may include Application-specific Integrated Circuits (ASICs), other chipsets, logic circuits, and/or data processors. The memories may include Read-Only Memory (ROM), Random Access Memory (RAM), flash memory, memory cards, storage media, and/or other storage devices. The RF units may include a baseband circuit for processing a radio signal. When the above-described embodiments are implemented in software, the above-described schemes may be implemented using a module (process or function) which performs the above function. The module may be stored in the memories and executed by the processors. The memories may be disposed to the processors internally or externally and connected to the processors using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for determining a cell identifier, the method comprising:
   generating, by a network controller, an Nth neighbor cell list comprising information on a neighbor cell of a detecting cell;
   receiving, by the network controller, information on a first physical cell identifier (PCI) and a global cell identifier of an unknown cell from the detecting cell, the first PCI being identification information in a local area that is also available for a cell other than the unknown cell and the global cell identifier being unique identification information allocated only to the unknown cell;
   determining, by the network controller, whether the unknown cell is a moving cell based on the global cell identifier; and
   transmitting, by the network controller, a PCI change signal that requests a change of the first PCI to the moving cell when the unknown cell is the moving cell and the first PCI is the same as a second PCI of the neighbor cell comprised in the Nth neighbor cell list,
   wherein the neighbor cell is listed in the Nth neighbor cell list based on a possibility of interference by movement of the moving cell on the basis of the detecting cell.

2. The method of claim 1, wherein the Nth neighbor cell list comprises a first neighbor cell and an nth neighbor cell, where n is a natural number of 2 or greater,
   the neighbor cell is one of the first neighbor cell and the nth neighbor cell,
   the first neighbor cell is a cell adjacent to the detecting cell, and
   the nth neighbor cell is a cell adjacent to an (n−1)th neighbor cell.

3. The method of claim 1, wherein the PCI change signal is transmitted to the moving cell when a distance between the moving cell and the neighbor cell is a threshold distance or shorter.

4. The method of claim 1, wherein the moving cell transmits a radio resource control (RRC) reconfiguration signal, which is generated based on the PCI change signal, to a user equipment (UE) served by the moving cell,
   the moving cell changes the first PCI to a third PCI when an acknowledgement (ACK) signal of the RRC reconfiguration signal is received from the UE, and
   the RRC reconfiguration signal comprises information on the third PCI.

5. A network controller for determining a cell identifier, the network controller comprising:
   a transmitter and a receiver that transmit and receive cable and radio signals, respectively; and a processor, operatively connected to the transmitter and receiver, that:

generates an Nth neighbor cell list comprising information on a neighbor cell of a detecting cell;

controls the receiver to receive information on a first physical cell identifier (PCI) and a global cell identifier of an unknown cell from the detecting cell, the first PCI being identification information in a local area that is also available for a cell other than the unknown cell and the global cell identifier being unique identification information allocated only to the unknown cell;

determines whether the unknown cell is a moving cell based on the global cell identifier; and controls the transmitter to transmit a PCI change signal that requests a change of the first PCI to the moving cell when the unknown cell is the moving cell and the first PCI is the same as a second PCI of the neighbor cell comprised in the Nth neighbor cell list, and the neighbor cell is listed in the Nth neighbor cell list based on a possibility of interference by movement of the moving cell on the basis of the detecting cell.

6. The network controller of claim 5, wherein the Nth neighbor cell list comprises a first neighbor cell and an nth neighbor cell, where n is a natural number of 2 or greater,
the neighbor cell is one of the first neighbor cell and the nth neighbor cell,
the first neighbor cell is a cell adjacent to the detecting cell, and
the nth neighbor cell is a cell adjacent to an (n−1)th neighbor cell.

7. The network controller of claim 5, wherein the PCI change signal is transmitted to the moving cell when a distance between the moving cell and the neighbor cell is a threshold distance or shorter.

8. The network controller of claim 5, wherein the moving cell transmits a radio resource control (RRC) reconfiguration signal, which is generated based on the PCI change signal, to a user equipment (UE) served by the moving cell,
the moving cell changes the first PCI to a third PCI when an acknowledgement (ACK) signal of the RRC reconfiguration signal is received from the UE, and
the RRC reconfiguration signal comprises information on the third PCI.

* * * * *